US012583421B2

(12) United States Patent
Shahin et al.

(10) Patent No.: US 12,583,421 B2
(45) Date of Patent: Mar. 24, 2026

(54) DRUM BRAKE WITH ROTATABLE BRAKE SHOE ASSEMBLY

(71) Applicant: HL MANDO CORPORATION, Pyeongtaek-si (KR)

(72) Inventors: Hatem Shahin, Pfaffenhofen (DE); Kai Braun, Friedrichsdorf (DE); Lothar Wagner, Simmern (DE)

(73) Assignee: HL MANDO CORPORATION, Pyeongtaek-si (KR)

( * ) Notice: Subject to any disclaimer, the term of this patent is extended or adjusted under 35 U.S.C. 154(b) by 404 days.

(21) Appl. No.: 18/198,578

(22) Filed: May 17, 2023

(65) Prior Publication Data

US 2023/0373448 A1     Nov. 23, 2023

(30) Foreign Application Priority Data

May 18, 2022     (DE) .......................... 102022204934.9

(51) Int. Cl.
| | |
|---|---|
| *B60T 1/06* | (2006.01) |
| *F16D 51/10* | (2006.01) |
| *F16D 65/00* | (2006.01) |
| *F16D 65/16* | (2006.01) |

(52) U.S. Cl.
CPC .............. *B60T 1/067* (2013.01); *F16D 51/10* (2013.01); *F16D 65/0031* (2013.01); *F16D 65/16* (2013.01)

(58) Field of Classification Search
None
See application file for complete search history.

(56) References Cited

U.S. PATENT DOCUMENTS

| | | | | |
|---|---|---|---|---|
| 1,926,064 A | * | 9/1933 | Sawtelle | ................. F16D 65/08 |
| | | | | 228/164 |
| 2,395,882 A | * | 3/1946 | Knox | ...................... F16D 49/08 |
| | | | | 188/77 R |
| 2,857,989 A | * | 10/1958 | Burnett | ................... F16D 55/46 |
| | | | | 192/65 |
| 5,117,957 A | * | 6/1992 | Latsko | .................... F16D 59/02 |
| | | | | 192/85.13 |

(Continued)

FOREIGN PATENT DOCUMENTS

| | | | | | |
|---|---|---|---|---|---|
| CN | 113879044 A | * | 1/2022 | ......... | B60B 27/0057 |
| DE | 931392 C | | 8/1955 | | |

(Continued)

OTHER PUBLICATIONS

CN-113879044-A: English Machine Translation (Year: 2022).*
Office Action of the corresponding DE application.

*Primary Examiner* — Melanie Torres Williams
(74) *Attorney, Agent, or Firm* — Harvest IP Law, LLP

(57) ABSTRACT

The invention relates to a drum brake assembly for braking a wheel a motor vehicle that rotates about a rotation axis, with:
  a brake drum having a back wall section extending at an angle to the rotation axis and a circumferential wall section,
  at least one brake shoe assembly,
wherein each of the brake shoe assembly and brake drum has a contact portion for contacting the respective other of the brake shoe assembly and brake drum to generate a braking force; and
wherein the brake shoe assembly is configured to be coupled to a rotatable axle component of the motor vehicle to rotate relative to the brake drum about the rotation axis.

9 Claims, 11 Drawing Sheets

(56) References Cited

U.S. PATENT DOCUMENTS

| | | | | |
|---|---|---|---|---|
| 2014/0262657 A1* | 9/2014 | Boonpongmanee | .... | F16D 49/00 |
| | | | | 188/77 R |
| 2021/0260918 A1* | 8/2021 | Sabeti | .................... | F16D 65/10 |
| 2022/0185369 A1* | 6/2022 | White | .............. | B60C 23/00318 |

FOREIGN PATENT DOCUMENTS

| | | | |
|---|---|---|---|
| DE | 2820065 | A1 | 12/1978 |
| JP | 2013-529766 | A | 7/2013 |
| KR | 10-2006-0063092 | A | 6/2006 |
| KR | 10-2011-0109358 | A | 10/2011 |

* cited by examiner

DRUM BRAKE WITH ROTATABLE BRAKE SHOE ASSEMBLY

CROSS-REFERENCE TO RELATED APPLICATION

This application is based on and claims priority under 35 U.S.C. § 119 to German Patent Application No. 102022202934.9, filed on May 18, 2022 in the German Patent and Trade Mark Office, the disclosures of which are incorporated herein by reference.

TECHNICAL FIELD

The invention concerns drum brake assembly for braking a wheel a motor vehicle that rotates about a rotation. The invention also concerns an axle assembly and a motor vehicle. The motor vehicle may be a road vehicle, such as a car, a truck or a bus.

BACKGROUND

Drum brakes are an established braking technology for motor vehicles. They typically comprise a brake drum having a contact portion at an inner circumferential face and further comprises a backing plate carrying brake shoes for contacting the contact portion. The brake drum is coupled to an axle component and/or to a vehicle wheel for a joint rotation therewith. The brake shoes, to the contrary, do not rotate jointly with the axle component. An example can be found in KR 2006 006 3092 A.

The brake drum is a comparatively heavy component made of a metallic material, in particular cast iron. The brake shoes, to the contrary, are comparatively light components e.g. comprising thin metallic parts of limited dimensions.

As with all components mounted to a motor vehicle, the drum brake affects the energy consumption of the motor vehicle due to contributing to the overall vehicle weight. Because the brake drum is a rotating component, it also affects the energy consumption also by way of its moment of inertia, e.g. at each acceleration.

SUMMARY

It is an object of the invention to reduce the impact of brake drums on the energy consumption of motor vehicles.

This object is solved by the subject matter according to the attached independent claims.

Accordingly, a drum brake assembly for braking a wheel a motor vehicle that rotates about a rotation axis is disclosed, with:
- a brake drum having a back wall section extending at an angle to the rotation axis and a circumferential wall section,
- at least one brake shoe assembly, wherein each of the brake shoe assembly and brake drum has a contact portion for contacting the respective other of the brake shoe assembly and brake drum to generate a braking force, wherein the brake shoe assembly is configured to be coupled to a rotatable axle component of the motor vehicle to rotate relative to the brake drum, Terms such as axial, radial and circumferential used herein may relate to the rotation axis. An axial direction may extend along said axis, a radial direction may extend orthogonally thereto and a circumferential direction may extend about said axis.

The brake drum may be configured to not be rotatable. For example, according to embodiments discussed below, it may be radially displaceable. Yet, it is preferably not rotatable about the rotation axis, let alone jointly rotatable with the brake shoe assembly and/or the axle component. In one example, the brake drum is non-movably fixed within the vehicle.

The disclosed drum brake assembly instead suggests to couple the brake shoes rotatably to the axle component. Combining the non-rotatable brake drum with a rotatable brake shoe assembly results in a decreased impact of the drum brake assembly on the energy consumption of the vehicle. In more detail, because the comparatively heavy brake drum is non-rotatable and the comparatively light brake shoes are rotated instead, less energy is required for rotating components of the drum brake assembly when accelerating (i.e. for overcoming the moment of inertia of said rotatable components).

Similarly, less brake energy is required for braking the comparatively light brake shoes compared to braking the rotatable brake drum of existing solutions. This can limit wear of the friction material used for braking as well as the amount of generated heat. The latter can cause undesired thermal expansions of components of the drum brake assembly which can impair pedal feel and brake performance.

The back wall section may be circular, but may also be segmented. For example, a number or part-circular back wall sections may be provided. The back wall section may have a plate shaped and/or may be substantially planar. It may an extend at an angle to the rotation axis. For example, the back wall section may extend at an angle of more than 60° or more than 80° to the rotation axis or may substantially extend orthogonally to the rotation axis. The back wall section may merge with and/or merge into the circumferential wall section. The circumferential wall section may extend orthogonally to the wall section. The back wall section may extend concentrically with respect to the rotation axis.

The back wall section may be free of a central through-hole or other structural features (e.g. bolt-holes) that enable a mechanical coupling of the brake drum to the rotating axle component. If provided with a central through-hole and in particular when receiving the axle component therein, the through-hole may be dimensioned so as to be radially spaced apart from the axle component. Alternatively, the back wall section may be closed in a portion facing the axle component (e.g. when viewed along the rotation axis).

The back wall section may form a base surface of a cylinder, the mantle of which is formed by the circumferential wall section. The brake drum may be formed as a cylinder that is open to one side, e.g. by missing a base surface opposite to the back wall section.

The circumferential wall section may extend concentrically to the rotation axis. It may be circular or comprise at least one a circular segment. It may define a cylindrical section or at least part-cylindrical section. In particular it may define a cylinder mantle surface or cylinder jacket (e.g. a cylinder without base surfaces) or comprise at least one segment of a cylinder mantle surface or cylinder jacket. The circumferential wall section may define an outer and/or inner circumferential face of the brake drum, wherein any of said faces e.g. extends around the rotation axes. The contact portion of the brake drum may be located at an inner circumferential face of the circumferential wall section. The circumferential wall section may define a largest diameter of the brake drum.

The circumferential wall section may, at a first axial end, merge with or be connected to the wall section. An opposite second axial end may be free and/or face away from the back wall section. The circumferential wall section may thus be supported on only one axial end. It may axially span across a contact portion of the brake shoe assembly.

The brake drum may be a one-piece member or a multi-piece member. It may comprise a metallic material, in particular cast iron.

The brake shoe assembly may directly be coupled to the rotatable axle component, e.g. by being mechanically fixed thereto. Alternatively, it may be coupled to at least one intermediate member (e.g. a backing plate) that is directly coupled to the rotatable axle component, e.g. by being mechanically fixed thereto. The brake shoe assembly or intermediate component may e.g. comprise a coupling portion (e.g. a through-hole or hub) that is configured (e.g. sized) to be coupled to the axle component.

The brake shoe assembly may comprise at least one radially extending support portion and a friction lining supported by the support portion and comprising at least one portion of the contact portion of the brake shoe assembly. The brake shoe assembly may comprise a plurality of support portions and friction lining segments each supported by a support portion. Each unit of a support portion and friction lining segment may form a single brake shoe. Alternatively, the brake shoe assembly may comprise a ring shaped continuous friction lining supported by a plurality of support portions.

According to a further embodiment, the brake drum is not rotatable about the rotation axis. For example, it may not be coupable to the rotatable axle component for a joint rotation therewith. As noted above, this may in particular include the back wall section being closed in a portion axially opposite the rotatable axle component and/or having a through hole exceeding an outer diameter of the axle component, e.g. by more than 10%.

In one example, the brake drum is configured to be coupled to a non-rotatable axle knuckle. For doing so, at least one coupling portion may be provided in any the back wall section or circumferential wall section. The at least one coupling portion may be configured to receive a mechanical fixing element (e.g. a bolt) for connecting to the axle knuckle. For example, the coupling portion may comprise at least one through-hole. If provided at the back wall section, the coupling portion may be closer to a radially outer edge of the back wall section than to the rotational axis. Securing the brake drum to the axle knuckle provides a reliable non-rotatable fixation with a low structural complexity.

According to a further development, at least one of the brake shoe assembly and the brake drum may be radially displaceable so as to contact the respective other of the brake shoe assembly and brake drum. The respective other of the brake shoe assembly and brake drum may not be radially displaceable, i.e. may be radially static. Only displacing one of the brake shoe assembly and brake drum reduces complexity, e.g. due to reducing the number of required actuators.

In this context, it may be provided that the radially displaceable one of the brake shoe assembly and the brake drum has at least one ring segment e.g. comprising at least a part of the contact portion. The contact portion may be provided at or as a curved circumferential face of the ring segment. Generally, the shape of any contact portion may conform to the shape of the respective other contact portion with which a contact is supposed to be established. For example, the contact portions may be similarly curved and/or dimensioned.

Providing ring segments allows for reliably contacting the respective other of the brake shoe assembly and the brake drum with a simple linear movement. If a plurality of ring segments is provided, a circumferential distance between them may change when being radially displaced. In case of the brake shoe assembly, this circumferential distance may increase when being moved radially outward to contact the brake drum.

In case of the brake drum, the circumferential distance may decrease when being moved radially inward to contact the brake shoe assembly.

When a plurality of ring segments is provided, these may be regularly distributed in a circumferential direction. Put differently, the angular distance between each two adjacent ring segments may be uniform.

Optionally, the contact portion of the respective other of the brake shoe assembly and brake drum that is not radially displaceable is formed as a continuous ring. This enables that a reliable and stable contact is established to an optional ring segment of the respective other member. Also, this provides a large surface area of the contact portion which improves heat dissipation. The enlarged surface area may also allow for a reduced layer thickness of a friction material that is optionally arranged at said contact portion, This reduces thermal insulation and further improves heat dissipation. It may generally be provided that the friction lining is comprises by the brake shoe assembly.

According to a further embodiment, the drum brake assembly comprises an actuator for displacing the respective radially displaceable one of the brake shoe assembly and brake drum. The actuator may be hydraulic or electric. When displacing the rotating brake shoe, the actuator is preferably electric and electrically connected to a slip ring assembly (e.g. that is comprised by an axle assembly disclosed herein). The actuator may receive electric energy via said slip ring assembly.

In one aspect, the drum brake assembly further comprises a brake dust cover that is arranged adjacent to at least one of the contact portions. Said contact portion may in particular be comprised by a non-radially displaceable one of the brake drum and brake shoe. This limits the weight and thus the required power of an actuator used for radially displacing the brake drum or brake shoe, respectively.

The brake dust cover may shield the contact portion from the surroundings, in particular when viewed in an axial direction. When viewed in a radial direction, the brake dust cover may extend along and/or overlap with the contact portion.

According to further aspect, the back wall section is intersected by the rotation axis. Differently put, an axial dimension of the back wall section may be set so as to be intersected by the rotation axis. Its radial dimension may thus at least extend from the rotation axis to the circumferential wall section. In the circumferential direction, the back wall section may be circular or may be segmented to support the optional at least one ring segment (e.g. formed or comprised by the circumferential wall section). Each segment of the back wall section may be at least as large as a ring segment it supports. A respective segmentation helps to reduce weight.

The invention also concerns an axle assembly for a motor vehicle, the axle assembly comprising a drum brake assembly according to any of the aspects disclosed herein and a rotatable axle component, the brake shoe assembly being coupled to the rotatable axle component, e.g. so as to jointly rotate therewith. The axle assembly may also comprise at least one component that is non-rotatable about the rotation axis, e.g. an axle knuckle. The brake drum may be coupled and in particular directly fixed to said non-rotatable component.

The invention also relates to a motor vehicle comprising an axle assembly according to any of the aspects disclosed herein. The brake drum may be fixed to any (e.g. adjacent) component of the motor vehicle that is non-rotatable about the rotation axis.

BRIEF DESCRIPTION OF DRAWINGS

Embodiments of the invention are discussed below with respect to the attached schematic figures. Throughout the figures, same features may be marked with same reference signs.

DETAILED DESCRIPTION

Figure 2:
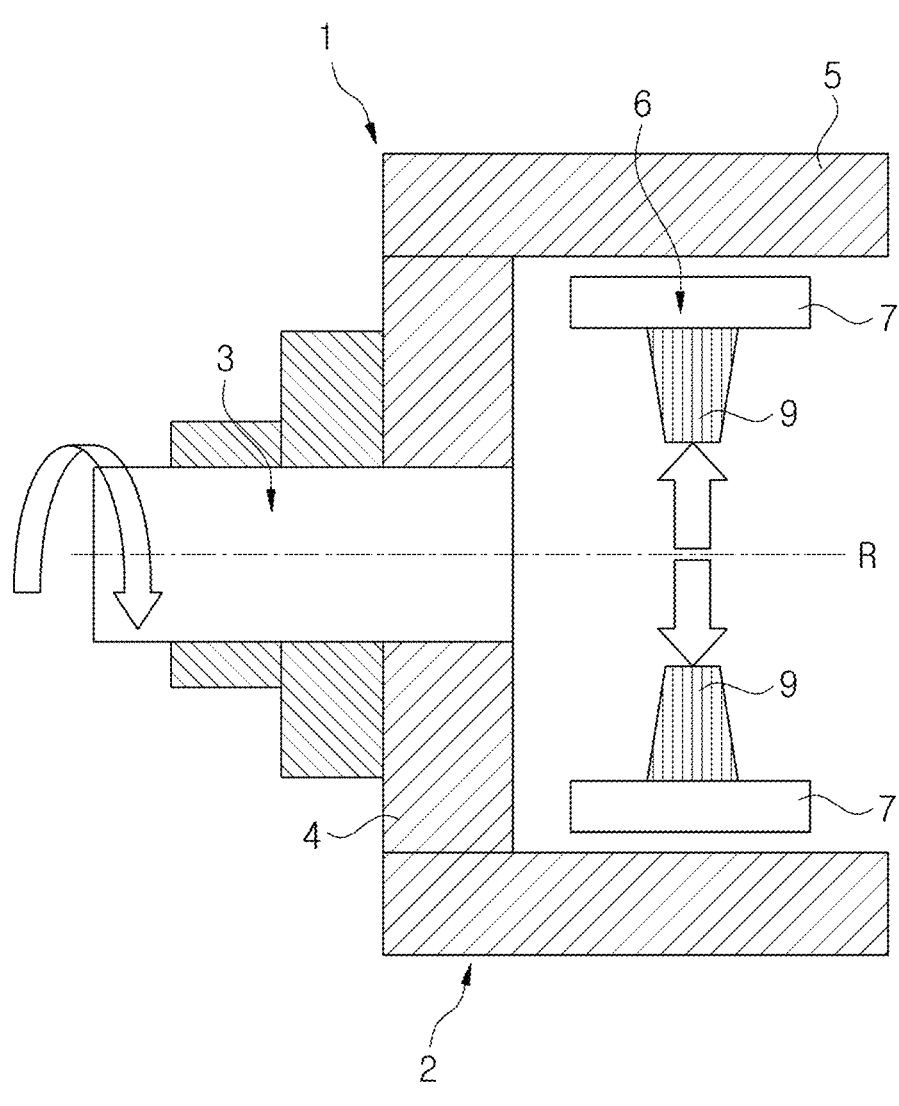
FIG. 2 shows a sectional view of a brake drum assembly according to the prior art.

First referring to FIG. 2, a sectional view of a drum brake assembly 1 according to the prior art is shown. The drum brake assembly 1 comprises a brake drum 2 that is fixed to an axle shaft 3. The axle shaft 3 and the brake drum 2 jointly rotate about a rotation axis R. The sectional plane of FIG. 2 contains the rotation axis R.

The brake drum 2 comprises a circular and plate-shape back wall section 4. The back wall section 4 extends orthogonally to the rotation axis R. The brake drum 2 also comprises a circumferential wall section 5 forming a cylinder mantle surface and being connected to or integrally formed with the back wall section 4. The brake drum is a massive metallic part that is typically produced by casting.

Within the brake drum 2 and facing an inner circumferential face of the circumferential wall section 5, a brake shoe assembly 6 is arranged. The brake shoe assembly 6 comprises two brake shoes 9. These are coupled to a non-rotatable backing plate (not illustrated). Each brake shoe 9 comprises a friction lining 7 forming a ring section of a limited angular dimension of less than 120°. Also, each brake shoe 9 and is radially displaceable to contact the inner circumferential face of the circumferential wall section 5.

In this existing configuration, the massive and comparatively heavy brake drum 2 is rotated. This requires a lot of energy during each acceleration.

Figure 1:
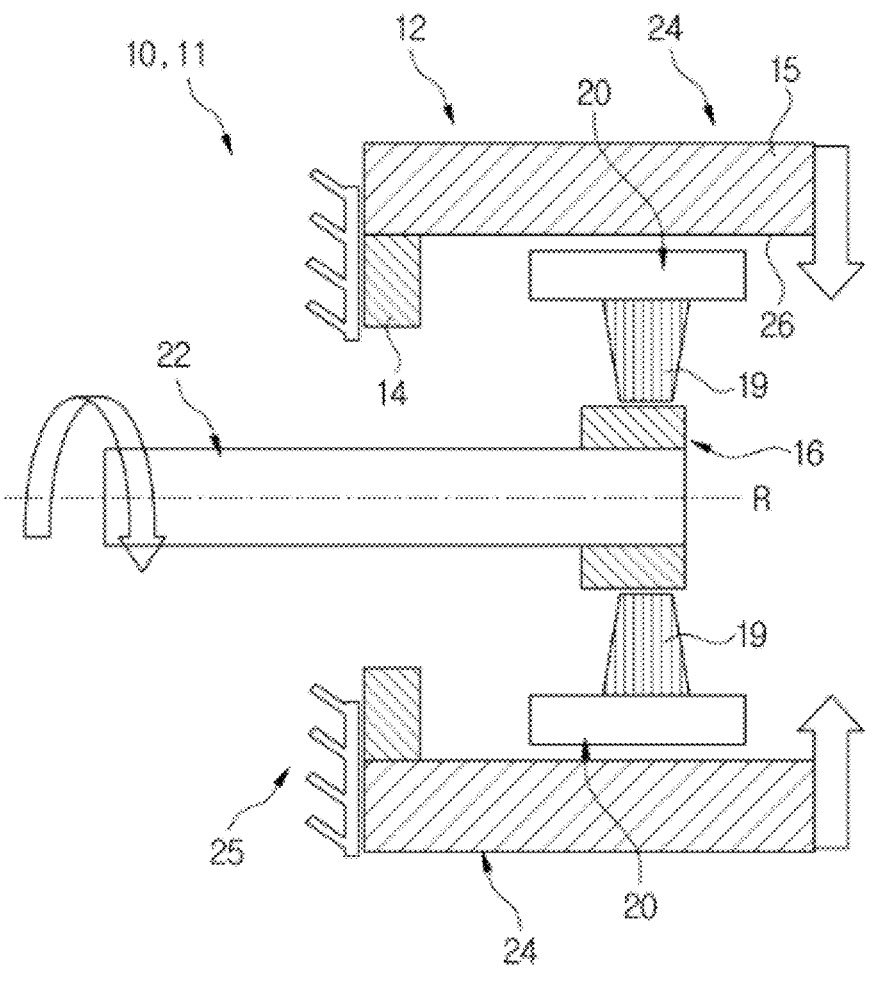
FIG. 1 shows a sectional view of a drum brake assembly according to a first embodiment of the invention.

FIG. 1 shows an alternative concept according to a first embodiment of the invention. A drum brake assembly 10 again comprises a brake drum 12. The brake drum 12 comprises at least two segments 24, each segment containing a segment of a back wall section 14 and of a circumferential wall section 15. More precisely, both of its a back wall section 14 and circumferential wall section 15 are segmented, each segment being smaller than a full circle. The circumferential wall section 15 and in particular its inner circumferential face which provides a contact portion 26 thus forms a ring segment (see also FIGS. 2-4 discussed below).

Also, a brake shoe assembly 16 is again arranged within the brake drum 12, comprising two support portions 19 carrying a friction lining 20. The friction lining 20 is formed as a continuous ring and provides a circular contact portion 26 of the brake shoe assembly 16. The brake shoe assembly 16 is fixed to a rotatable axle shaft (i.e. to a rotatable axle component 22). The circumferential wall section 15 axially spans across and covers the contact portion 26 of the brake shoe assembly 16.

The brake drum 12 is not rotatably fixed to said axle shaft (axle component 22). Instead, the brake drum 12 is generally non-rotatable about the rotation axis R. Yet, its segments 24 are radially displaceable, e.g. by each being slidingly connected to a non-rotatable component 25. In FIG. 1, arrows indicate a radial displacement of the segments 24 radially inward towards and against the friction lining 20. Each segment 24 is connected to a non-illustrated actuator (e.g. a hydraulic or electric cylinder) for providing said displacement.

The drum brake assembly 10 and axle component 22 form an axle assembly 11 according to an embodiment of this invention.

Figure 3:
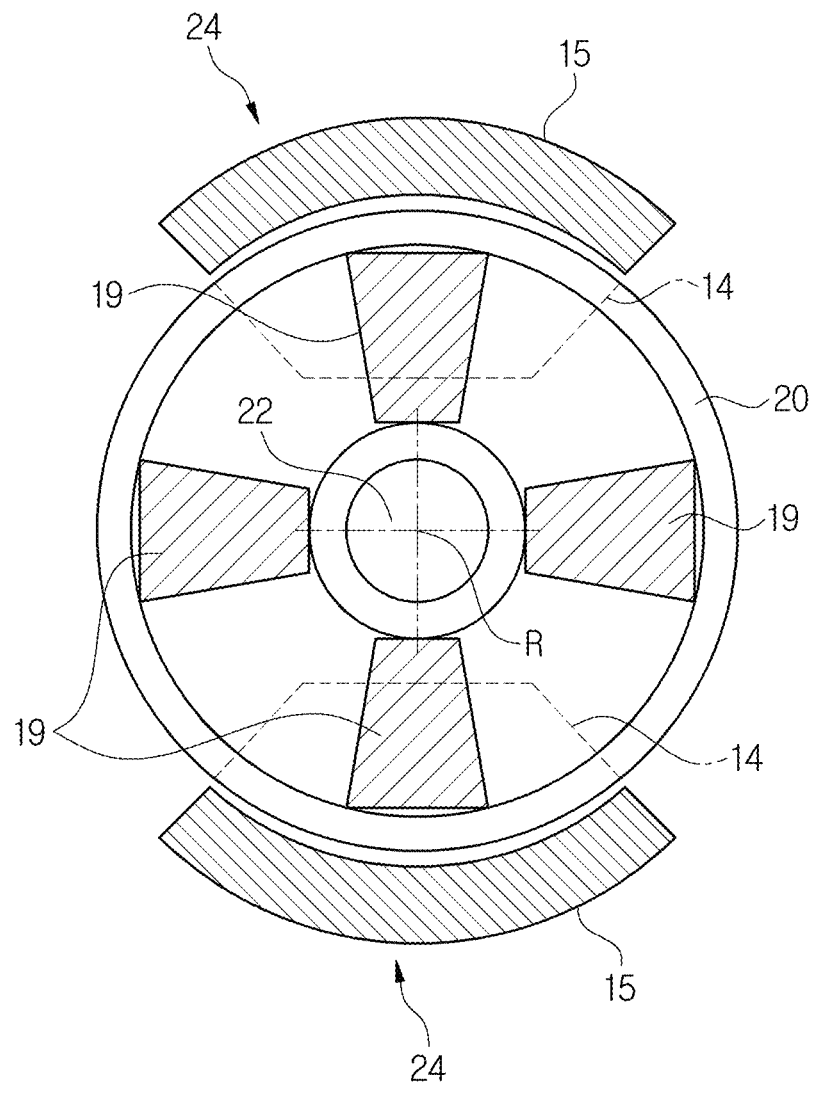
FIG. 3 is a front view of the drum brake assembly according to the first embodiment.

FIG. 3 is a front view of the drum brake assembly 10 of FIG. 1. It can be seen that actually four support portions 19 are provided that carry the ring-shaped friction lining 20. Also, the segments 24 of the brake drum 12 are shown, with the circumferential wall section 15 forming a ring segment. The segments of the back wall section 14 that are each connected to one of said ring segments are indicated by dotted lines.

Figure 4:
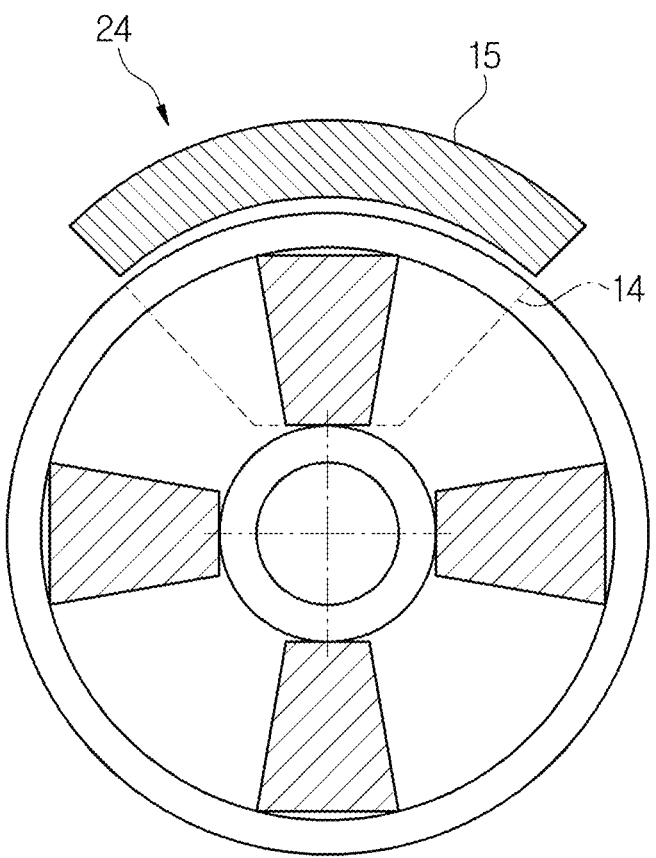
FIG. 4 shows a drum brake assembly according to a second embodiment of the invention.

FIG. 4 shows an alternative embodiment with only one segment 24 of the brake drum 12. This increases weight savings but can be accompanied with a reduced braking effect compared to the embodiment of FIG. 3.

Figure 5:
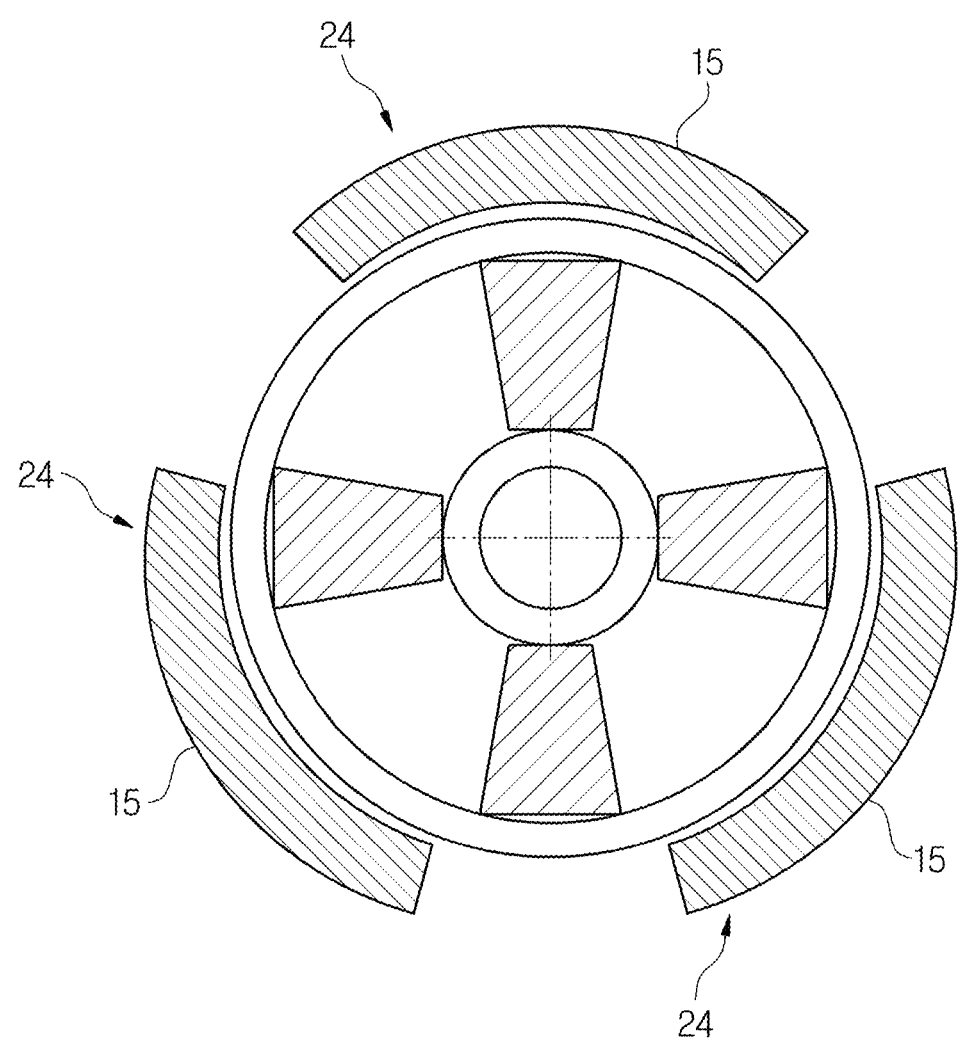
FIG. 5 shows a sectional view of the brake drum of drum brake assembly according to a third embodiment of the invention.

FIG. 5 shows another alternative embodiment with three segments 24 of the brake drum 12. The segments 24 are spaced apart from one another by a uniform angular distance to provide a uniform braking effect.

Each of the segments 24 in FIGS. 4 and 5 is configured similarly to the segments 24 of FIGS. 1 and 3. The number of segments 24 can be larger than three.

FIGS. 6-9 show further embodiments in which the contact portion 26 of the brake shoe assembly 16 is not shaped as a continuous ring but is segmented into ring segments. Each contact area segment is comprised by a respective friction lining segment and each friction lining segment is supported by a support portion 19. In each of these embodiments, the brake drum 12 is again not rotatable, whereas the brake shoe assembly 16 is rotatable and connected to a rotating axle component 22.

Figure 6:
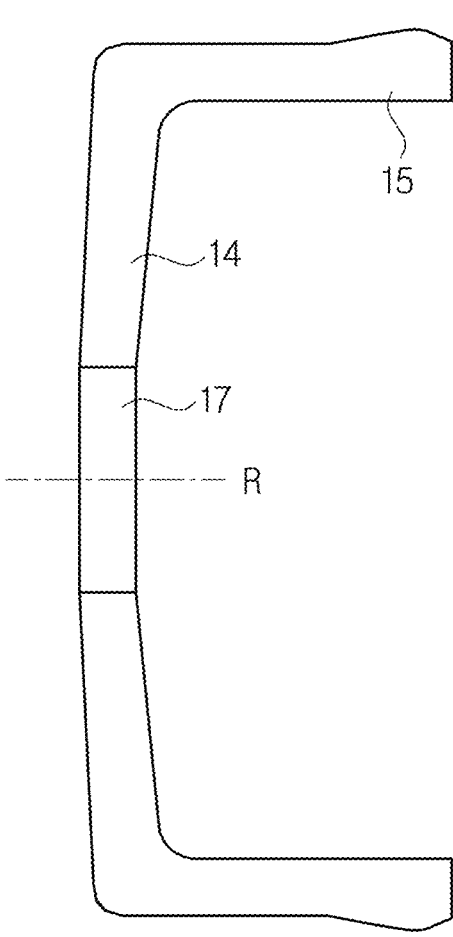
FIG. 6 shows a front view of the drum brake assembly according to the fourth embodiment of the invention.
Figure 7:
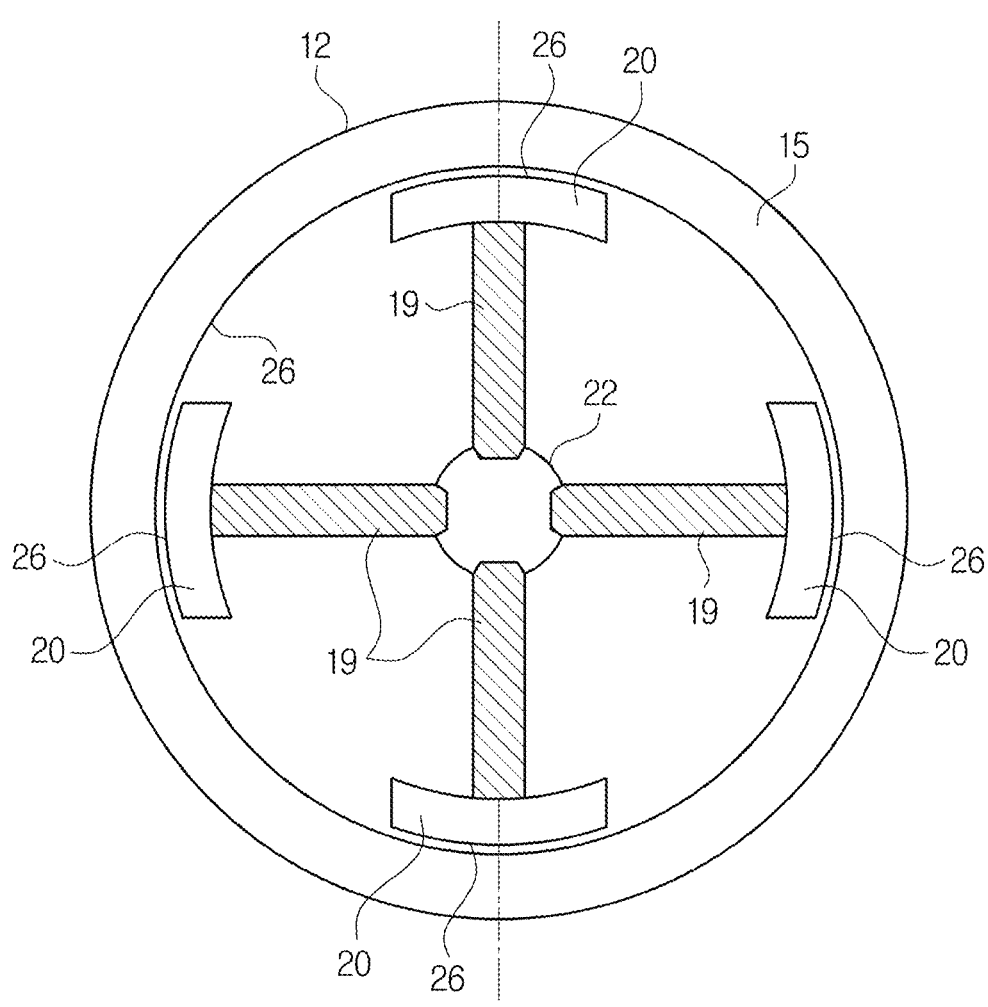
FIG. 7 shows a sectional view of a drum brake assembly according to a fifth embodiment of the invention.

Referring to the embodiments of FIGS. 6 and 7, the brake drum 12 and specifically its circumferential wall section 15 is not segmented into ring segments. Instead, it is formed as a continuous ring having a respectively continuous contact portion 26.

FIG. 6 is a sectional view of the brake drum 12 with the sectional plane including a rotation axis R of the axle component 22. From FIG. 6, it is evident that the back wall section 14 is plate-shaped and circular and extends orthogonally to and being intersected by the rotation axis R. At both of its radial outer ends, it merges with the circumferential wall section 15. At its central portion 17, the back wall section 14 is preferably closed. If provided with an e.g. weight reducing through-hole, the axle component 22 does not extend therethrough or is at least not mechanically connected to the central portion 17.

Figure 8:
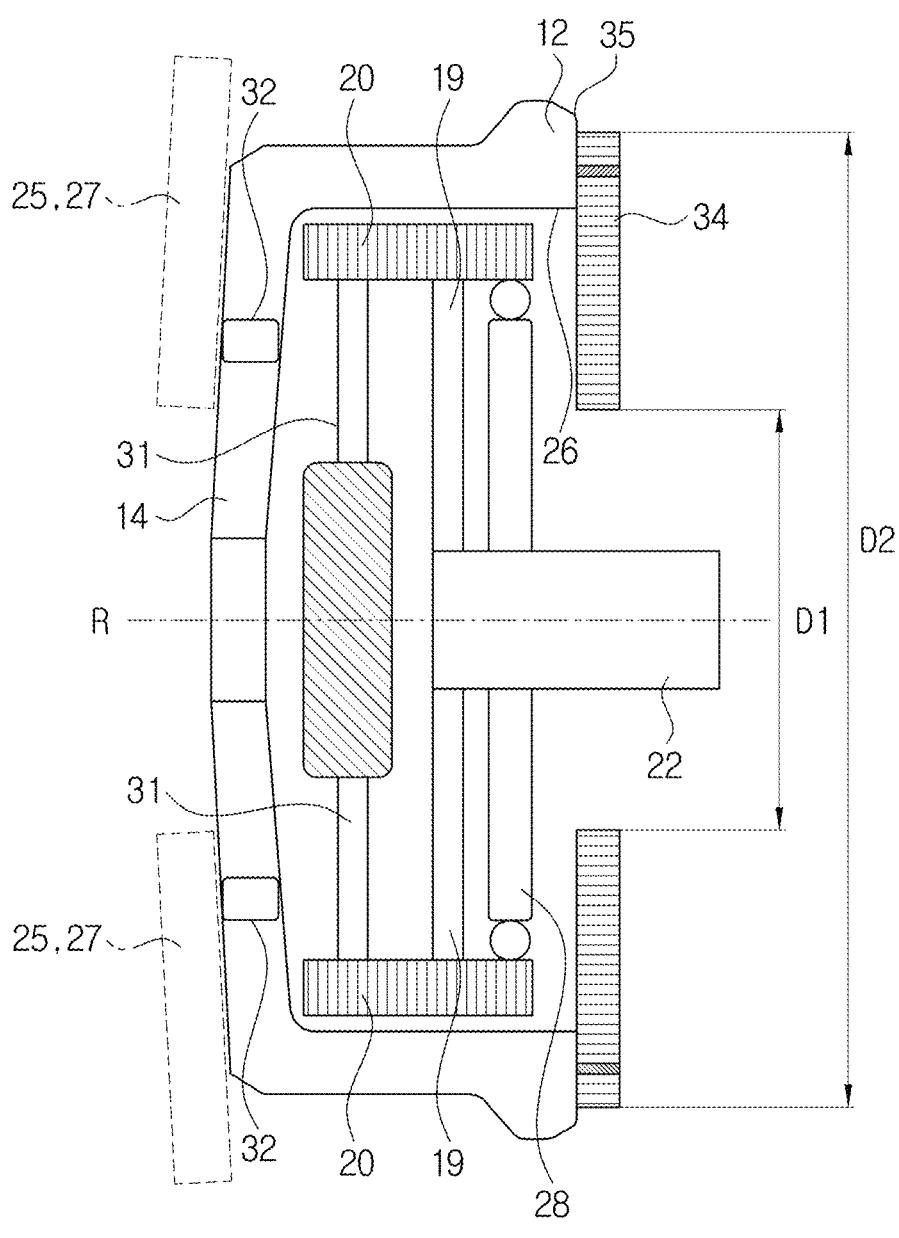
FIG. 8 shows a sectional view of a drum brake assembly according to a sixth embodiment of the invention.

FIG. 8 is a sectional view of another embodiment of a drum brake assembly 10. The brake shoe assembly 16 of this drum brake assembly 10 is configured similarly to FIG. 7. As further optional components, a resetting spring 28 according to known configurations and an electric actuator 30 are shown. The electric actuator 30 is supplied with electric power via a non-illustrated slip ring that is coupled to the axle component 22.

The electric actuator 30 comprises radially displaceable cylinders 31 configured to radially displace the friction lining (segments) 20 (e.g. by way of tilting movement according to known configurations and/or with the friction lining (segments) 20 being tiltably connected to the support portions 19) to contact the adjacent contact area 26 of the brake drum 12. Alternatively, the support portions 19 may be radially displaced by the actuator 30 or, in other words, may form radially displaceable cylinders 31.

The brake drum 12 is fixed to a non-rotatable component 25, in particular formed by an axle knuckle 27. For doing so, through holes 32 are provided in the back wall section 14 for receiving non-illustrated fixing bolts.

As a further optional feature, a brake dust cover 34 is shown. The brake dust cover 34 is a planar ring-shaped member. Its inner diameter D1 is large enough to receive the axle component 22, whereas its outer diameter D2 is large enough to be connected an open end face 35 of the circumferential wall section 15. The brake dust cover 34 is thus adjacent to both contact portions 26 and radially overlaps with both contact portions 26 (i.e. of the brake drum 12 as well as the brake shoe assembly 16). It thus shields said contact portions 26 from the surroundings to limit the emission of brake dust.

Figure 9:
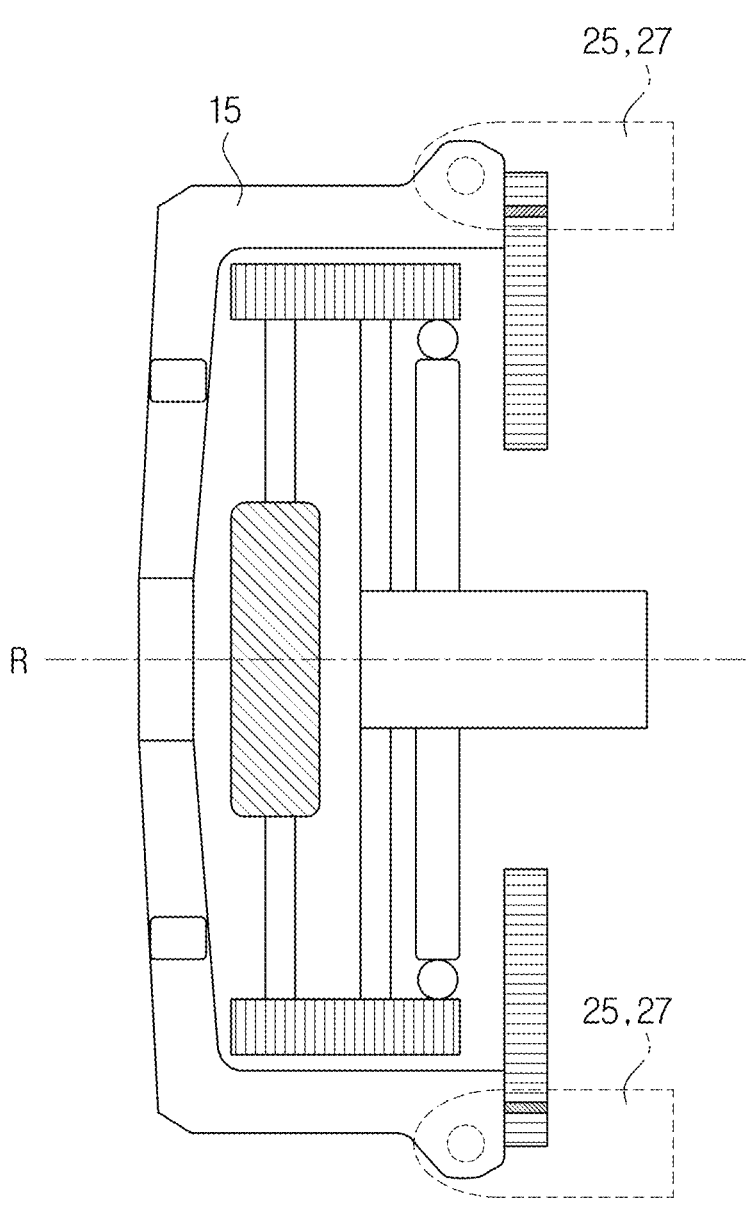
FIG. 9 shows a sectional view of a drum brake assembly according to a seventh embodiment of the invention.

The embodiment of FIG. 9 is largely similar to the embodiment of FIG. 8 apart from the non-rotatable fixation of the brake drum 12 in the motor vehicle. Specifically, in FIG. 9, the circumferential wall section 15 is connected to a non-rotatable component 25 (e.g. the axle knuckle 27), the latter being only schematically indicated by dotted lines and e.g. being outside of a sectional second plane.

Figure 10:
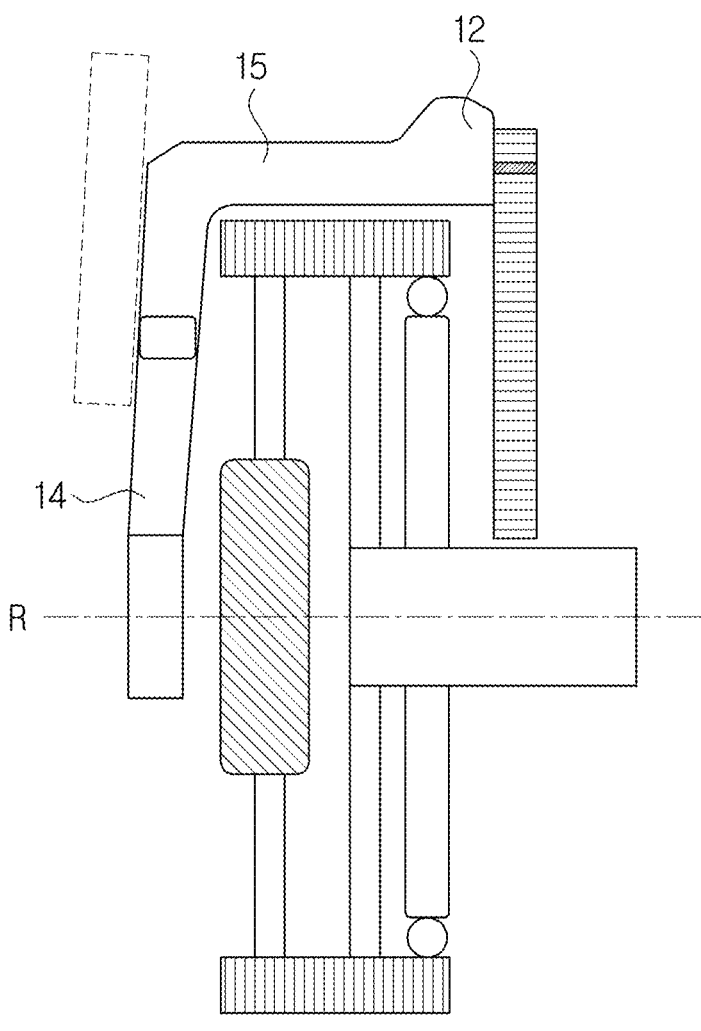
FIG. 10 shows a sectional view of a drum brake assembly according to an eighth embodiment of the invention.
Figure 11:
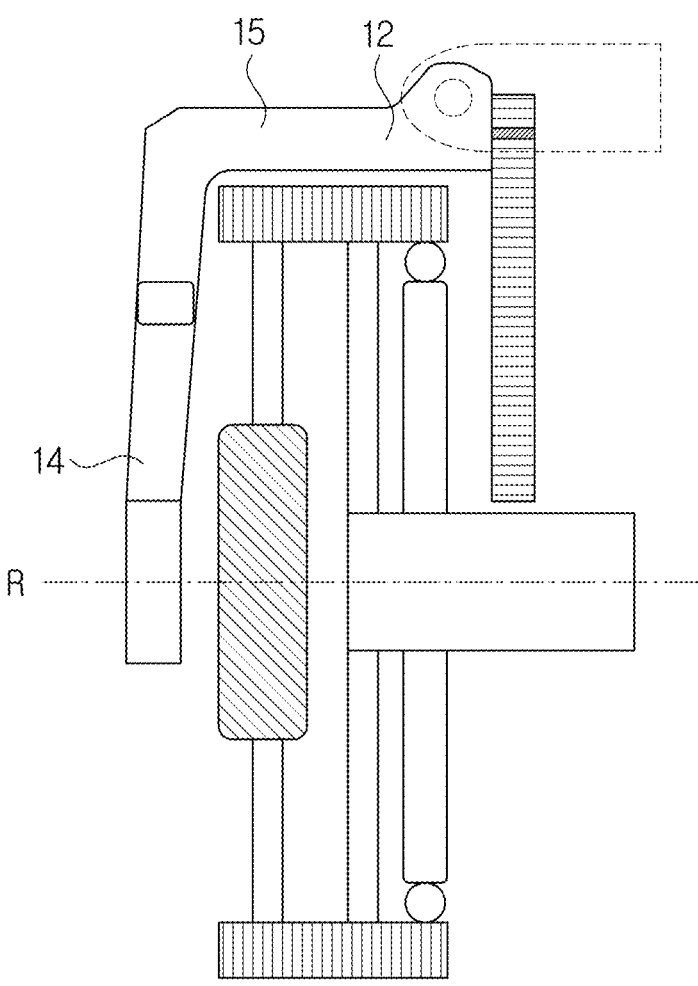
FIG. 11 shows a sectional view of a drum brake assembly according to an ninth embodiment of the invention.

FIG. 10 shows an embodiment similar to that of FIG. 8 and FIG. 11 shows an embodiment similar to that of FIG. 9. In both cases, the only difference to the embodiments of FIG. 8 and FIG. 9, respectively, is a reduced sized of the brake drum 12. More precisely, the brake drum 12 is not formed as a cylindrical member with the back wall section 14 forming a circular base surface, but only as a half cylinder. Accordingly, the back wall section 14 is shaped as a half circle and the circumferential wall section 15 a half ring segment (or half cylindrical mantel surface). This may increase weight savings while possibly reducing an achievable braking effect compared to FIGS. 8 and 9. Optionally, the back wall section 14 is still intersected by the rotation axis R e.g. to increase the size and stiffness brake drum 12.

What is claimed is:

1. A drum brake assembly for braking a wheel of a motor vehicle that rotates about a rotation axis,
with:
a brake drum having a back wall section extending at an angle to the rotation axis and a circumferential wall section,
at least one brake shoe assembly,
wherein each of the brake shoe assembly and the brake drum has a contact portion for contacting the respective other of the brake shoe assembly and brake drum to generate a braking force;
wherein the brake shoe assembly is configured to be coupled to the motor vehicle to rotate relative to the brake drum about the rotation axis, and
wherein the brake drum is radially displaceable so as to contact the brake shoe assembly.

2. The drum brake assembly according to claim 1,
wherein the brake drum is not rotatable about the rotation axis.

3. The drum brake assembly according to claim 1,
wherein the brake drum is configured to be coupled to a non-rotatable axle knuckle.

4. The drum brake assembly according to claim 1,
wherein the contact portion of the brake drum comprises at least one ring segment.

5. The drum brake assembly according to claim 4,
wherein the contact portion of the brake shoe assembly is formed as a continuous ring.

6. The drum brake assembly according to claim 1,
further comprising an actuator for displacing the brake drum.

7. The drum brake assembly according to claim 1,
further comprising a brake dust cover that is arranged adjacent to the contact portions.

8. The drum brake assembly according to claim 4,
wherein the brake shoe assembly comprises a friction ring formed as a continuous ring.

9. An axle assembly for a motor vehicle,
the axle assembly comprising a drum brake assembly according to claim 1 and a rotatable axle component,
the brake shoe assembly of the drum brake assembly being coupled to the rotatable axle component.

* * * * *